(12) United States Patent
Choi

(10) Patent No.: US 7,710,514 B2
(45) Date of Patent: May 4, 2010

(54) LIQUID CRYSTAL DISPLAY COMPRISING A LIGHT GUIDING PLATE COMPRISING A PROTRUSION AND METHOD HAVING THE SAME

(75) Inventor: Seong-sik Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 341 days.

(21) Appl. No.: 11/414,907

(22) Filed: May 1, 2006

(65) Prior Publication Data

US 2007/0008449 A1 Jan. 11, 2007

(30) Foreign Application Priority Data

Jul. 7, 2005 (KR) ...................... 10-2005-0061393

(51) Int. Cl.
- G02F 1/1333 (2006.01)
- G02F 1/1335 (2006.01)
- F21V 7/04 (2006.01)

(52) U.S. Cl. .......................... 349/65; 349/58; 362/615; 362/628

(58) Field of Classification Search ............. 349/58–60, 349/61–71, 63, 65; 362/615, 632–634
See application file for complete search history.

(56) References Cited

U.S. PATENT DOCUMENTS

| | | | |
|---|---|---|---|
| 5,584,556 A * | 12/1996 | Yokoyama et al. ............. 349/62 |
| 5,815,227 A * | 9/1998 | Lee ................. 349/67 |
| 5,967,637 A * | 10/1999 | Ishikawa et al. ............. 362/621 |
| 6,426,763 B1 * | 7/2002 | Sagawa ....................... 346/65 |
| 6,512,557 B1 * | 1/2003 | Miwa ........................... 349/58 |
| 6,609,808 B2 * | 8/2003 | Chen ........................... 362/632 |
| 7,131,763 B2 * | 11/2006 | Lin ............................ 362/609 |
| 2002/0044234 A1 * | 4/2002 | Choi ........................... 349/65 |
| 2002/0057562 A1 * | 5/2002 | Sasako et al. .................. 362/31 |
| 2003/0231264 A1 * | 12/2003 | Kim ............................ 349/61 |
| 2004/0257494 A1 * | 12/2004 | Park ........................... 349/65 |
| 2005/0226005 A1 * | 10/2005 | Yang .......................... 362/634 |
| 2005/0243238 A1 * | 11/2005 | Cha et al. ..................... 349/58 |

FOREIGN PATENT DOCUMENTS

| | | |
|---|---|---|
| JP | 10048427 A | 2/1998 |
| JP | 2002090739 A | 3/2002 |
| JP | 2002-251911 | 9/2002 |
| JP | 2003249101 A | 9/2003 |
| KR | 10-2001-0039926 | 5/2001 |
| KR | 2002-0029709 | 4/2002 |

* cited by examiner

*Primary Examiner*—Andrew Schechter
*Assistant Examiner*—Charles Chang
(74) *Attorney, Agent, or Firm*—Cantor Colburn LLP

(57) ABSTRACT

An liquid crystal display (LCD) including an LCD panel and a light guiding plate disposed on the rear of the LCD panel. The light guiding plate includes a main body, a fixing part extended from a side of the main body, and a protrusion formed on a rear of the light guiding plate and on a boundary area of the fixing part and the main body.

16 Claims, 5 Drawing Sheets

LIQUID CRYSTAL DISPLAY COMPRISING A LIGHT GUIDING PLATE COMPRISING A PROTRUSION AND METHOD HAVING THE SAME

CROSS-REFERENCE TO RELATED APPLICATIONS

This application claims priority to Korean Patent Application No. 2005-0061393, filed on Jul. 7, 2005, and all the benefits accruing therefrom under 35 U.S.C. §119, the contents of which are incorporated herein by reference in its entirety.

BACKGROUND OF THE INVENTION

1. Field of the Invention

The present invention relates to a liquid crystal display, and more particularly, to a liquid crystal display comprising a light guiding plate or a diffusion plate to lead light generated in a light source to a rear of an LCD panel.

2. Description of the Related Art

In general, a liquid crystal display ("LCD") is a device for displaying images, with liquid crystal cells are aligned in a matrix form where the light transmittance of the cells is adjusted according to an image signal. The LCD forms images on an LCD panel using light radiated from a backlight unit.

The LCD includes an LCD panel in which liquid crystal cells are formed in a pixel unit and aligned in a matrix form, a backlight unit providing light to the LCD panel, and an accommodating container accommodating the backlight unit. Further, the backlight unit includes a light guiding plate disposed in a rear of the LCD panel and a light source unit disposed along one lateral side of the light guiding plate. The light guiding plate is accommodated in the accommodating container. In order to secure or fix the light guiding plate, there are formed one or more fixing parts on at least one lateral side of the light guiding plate. The fixing parts are settled in a groove disposed in a side of the accommodating container, where the fixing parts are extended from the light guiding plate.

The LCD has been widely employed in computer monitors and a television monitors but also in a display apparatus for a navigator system and a portable display apparatus for a notebook computer, a mobile phone, or the like. Apparatus employing the LCD are vulnerable to external impact and damage. Therefore, it is desired to protect the LCD from the external impact and reduce or prevent damage to the LCD.

If the LCD is not sufficiently strong or damage resistant in its configuration, components inside the LCD may be damaged by the external impact. The light guiding plate is especially fragile against the external impact since it is a plate shape with a predetermined thickness. A boundary area defined by a main body of the light guiding plate and a fixing part thereof, is especially loaded when the external impact is applied to the LCD, making the LCD susceptible to easily being damaged, such as by a crack being generated.

A crack may also be easily generated in a diffusion plate employed in a direct type LCD for substantially the same reasons discussed above for the light guiding plate.

SUMMARY OF THE INVENTION

One exemplary embodiment of the present invention provides a liquid crystal display (LCD) including a light guiding plate which includes enhanced strength.

Another exemplary embodiment of the present invention provides a direct type LCD including a diffusion member which includes enhanced strength.

Another exemplary embodiment according to the present invention provides an LCD including an LCD panel and a light guiding plate disposed on a rear of the LCD panel. The light guiding plate includes a main body, a fixing part extended from a side of the main body, and a protrusion formed on a rear of the light guiding plate and on a boundary area of the fixing part and the main body.

Another exemplary embodiment according to the present invention provides an LCD including a light source unit, a diffusion member disposed on the light source unit and an LCD panel. The diffusion member includes a main body, a fixing part projected on a side of the main body and a protrusion formed on a boundary area of the fixing part and the main body. The LCD panel is disposed on a side of the diffusion member away from the protrusion.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF THE INVENTION

Figure 1:
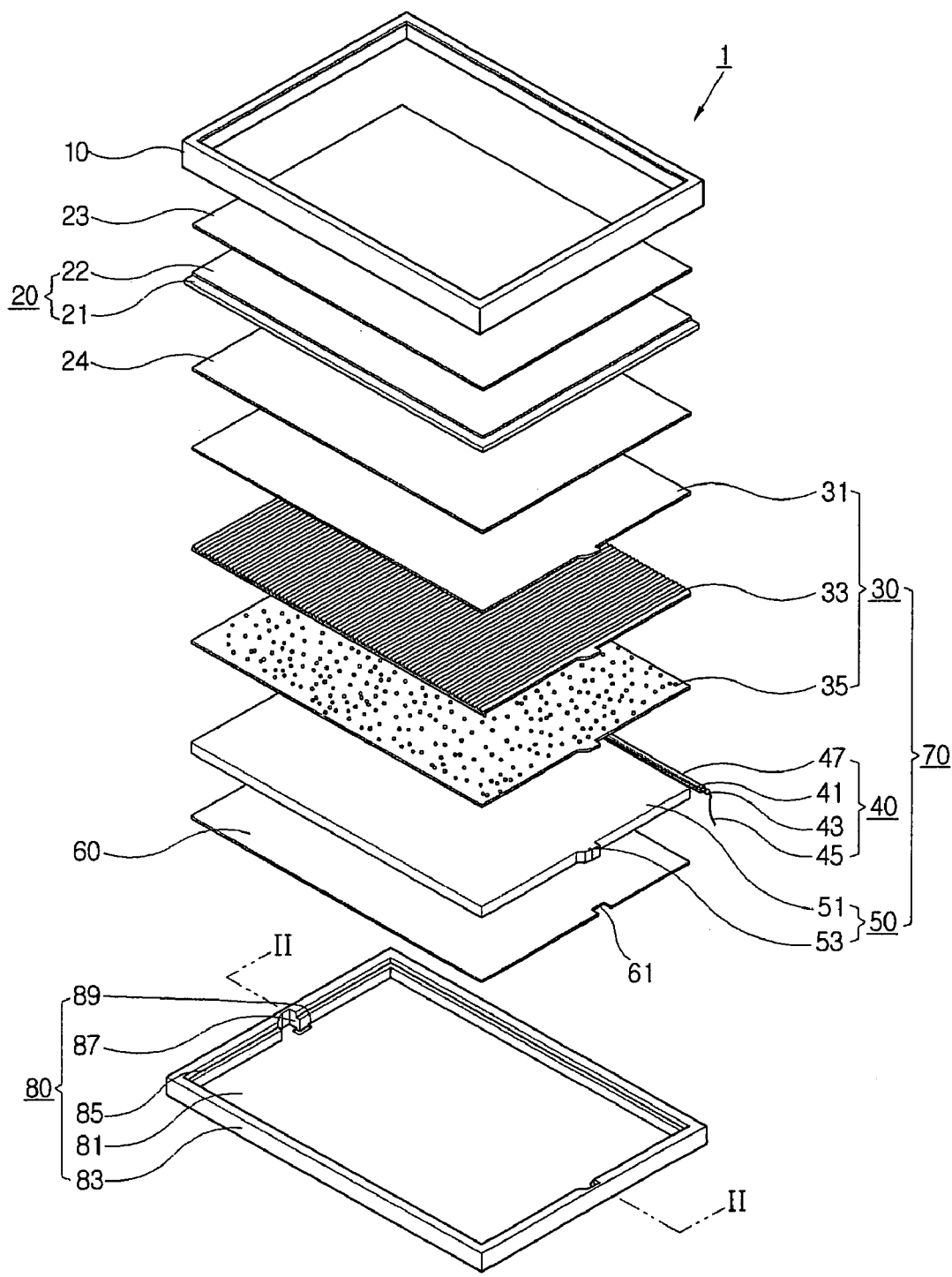
FIG. 1 is an exploded perspective view of an exemplary embodiment of an LCD according to the present invention.

Reference will now be made in detail to exemplary embodiments of the present invention, examples of which are illustrated in the accompanying drawings, wherein like reference numerals refer to like elements throughout.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" or "lower" relative to other elements or features would then be oriented "above" or "upper" relative to the other elements or features. Thus, the exemplary term "under" can encompass both an orientation of under and above. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

As shown in FIG. 1, an LCD 1 includes an LCD panel 20 forming images, a driver integrated circuit (not shown) driving the LCD panel 20, a backlight unit 70 providing light to the rear of the LCD panel 20, an accommodating container 80 accommodating and receiving the backlight unit 70, and a fixing member 10 combined with the accommodating container 80 and covering the front surface of the LCD panel 20.

The LCD panel 20 includes a thin film transistor ("TFT") substrate 21, a color filter substrate 22 adhering opposite to the TFT substrate 21, and liquid crystals (not shown) interposed between the two substrates. Also, the LCD panel 20 further includes polarizing plates 23, 24 disposed in front of (on an upper surface) the color filter substrate 22 and in the rear of (on a lower surface) the TFT substrate 21, respectively, to polarize light passing through the LCD panel 20. The LCD panel 20 includes a pixel unit (not shown) that includes aligned liquid crystal cells (not shown) arranged substantially in a matrix form. The liquid crystal cells are controlled to determine light transmittance according to image signals transmitted from the driver integrated circuit to form an image.

A plurality of gate lines and a plurality of data lines are formed on the TFT substrate 21 in a matrix form and a TFT is formed at the intersection of the gate line and the data line. A signal voltage transmitted from the driver integrated circuit is applied between a pixel electrode and a common electrode of the color filter substrate 22 through the TFT. Under the control of the TFT, the liquid crystals between the pixel electrode and the common electrode are aligned by the signal voltage, thereby determining light transmittance.

In exemplary embodiments the color filter substrate 22 includes a color filter and the common electrode. In exemplary embodiments, the color filter may include set of individual red, green and blue or cyan, magenta and yellow color filters repeatedly formed thereon with the boundary of a black matrix. In other exemplary embodiments, the common electrode may include a transparent conductive substance such as ITO (Indium Tin Oxide), IZO (Indium Zinc Oxide), or any material suitable for the purpose described herein. In one exemplary embodiment, the color filter substrate 22 has a smaller area than the TFT substrate 21.

In another exemplary embodiment, the front polarizing plate 23 crosses the rear polarizing plate 24, whereby the rear polarizing plate 24 polarizes light incident on the LCD panel 20 and the front polarizing plate 23 essentially functions as an analyzer.

The driver integrated circuit includes a terminal to be electrically connected and is mounted on the TFT substrate 21 to be connected to end portions of the gate line and the data line of the TFT substrate 21 extended from a display area to a non-display area.

The backlight unit 70 includes a plurality of optical sheets 30 disposed substantially parallel to each other on the rear of the LCD panel 20, a light source unit 40 providing light to the rear of the LCD panel 20 through the optical sheets 30, a light guiding plate 50 essentially leading light generated in the light source unit 40 to the rear of the LCD panel 20, and a reflective sheet 60 disposed between the light guiding plate 50 and the accommodating container 80 to uniformly spread light provided from the light source unit 40 to progress to the rear of the LCD panel 20.

The optical sheets 30 include a protection sheet 31 disposed in the rear of the LCD panel 20, a prism sheet 33 and a diffusion sheet 35. In one exemplary embodiment, the diffusion sheet 35 includes a base plate and a coating layer having beads formed on the base plate. The diffusion sheet 35 diffuses light from a lamp 41 to provide the light to the LCD panel 20. In alternative exemplary embodiments, two or three sheets of the overlapping diffusion sheet 35 may be used.

On the prism sheet 33, there are formed triangular prisms at a predetermined alignment. The prism sheet 33 concentrates light diffused in the diffusion sheet 35 in a direction substantially perpendicular (vertical) to a surface of the LCD panel 20. In alternative exemplary embodiments, the prism sheet 33 is used in a pair and micro prisms formed on the each prism sheet 33 form a predetermined angle with each other. The light passing through the prism sheet 33 progresses vertically for forming a uniform brightness distribution. The protection sheet 31, disposed above the prism sheet 33 and the diffusion sheet 35, protects the prism sheet 33, which may be vulnerable to scratching.

The light source unit 40 includes a lamp 41 radiating light, a lamp electrode 43 formed at the end of the lamp 41, a lamp wire 45 connected to the lamp electrode 43 and a lamp reflector 47 encompassing the lamp 41. In exemplary embodiments, two or more lamp electrodes 43 may be used, whereby the lamp wire 45 is connected to the lamp electrodes 43. The light source unit 40 is supplied with electric power from an inverter (not shown) through the lamp wire 45. In exemplary embodiments, the lamp electrode 43 and the lamp wire 45 may be soldered together. The lamp 41 is disposed along one lateral side of the light guiding plate 50 in a direction substantially parallel to the longitudinal side of the light guiding plate 50. In alternative exemplary embodiments, the lamp 41 may be disposed along both lateral sides of the light guiding plate 50, or a plurality of lamps 41 may be disposed substantially in parallel essentially stacked in an up and down direction.

In exemplary embodiments, a cold cathode fluorescent lamp ("CCFL") is used as a light source. In alternative exemplary embodiments, an external electrode fluorescent lamp ("EEFL") may be used, which has high brightness, low cost and low consumption of electric power, and is capable of driving a plurality of light source units 40 with one inverter (not shown). In another alternative exemplary embodiment, a light emitting diode ("LED") may be used as a light source, which is excellent in brightness and color reproducibility.

The light guiding plate 50 is disposed substantially parallel to and along one lateral side of the lamp 41 and in the rear of the LCD panel 20 to lead light generated in the lamp 41 to the rear of the LCD panel 20. The light guiding plate 50 includes an incident surface receiving light from the lamp 41, an exit surface extended from and adjacent the incident surface to face (or be substantially parallel to a surface of) the LCD panel 20, and a rear surface having a pattern thereon to progress light irradiated to the incident surface from the lamp to the exit surface.

The light guiding plate 50 converts light irradiated to the incident surface from the lamp 41 into plane light to evenly transmit the light to the LCD panel 20 through the exit surface. In exemplary embodiments, the light guiding plate 50 may include polymethylmethacrylate ("PMMA"), which is sufficiently strong as to not be easily deformed or broken and is excellent in transmittance.

In other exemplary embodiment, the light guiding plate 50 may be a wedge shape type, of which a lower surface is slant and an upper surface is flat, or a plate type, of which both upper and lower surfaces are substantially flat or planar shape. In one exemplary embodiment where the LCD is used for small-sized products such as a notebook computer or a mobile phone, the wedge-type light guiding plate 50 may be employed. In another exemplary embodiment employing the wedge-type light guiding plate 50, the lamp 41 may be disposed along one lateral side which is thicker than another lateral side.

Figure 3:
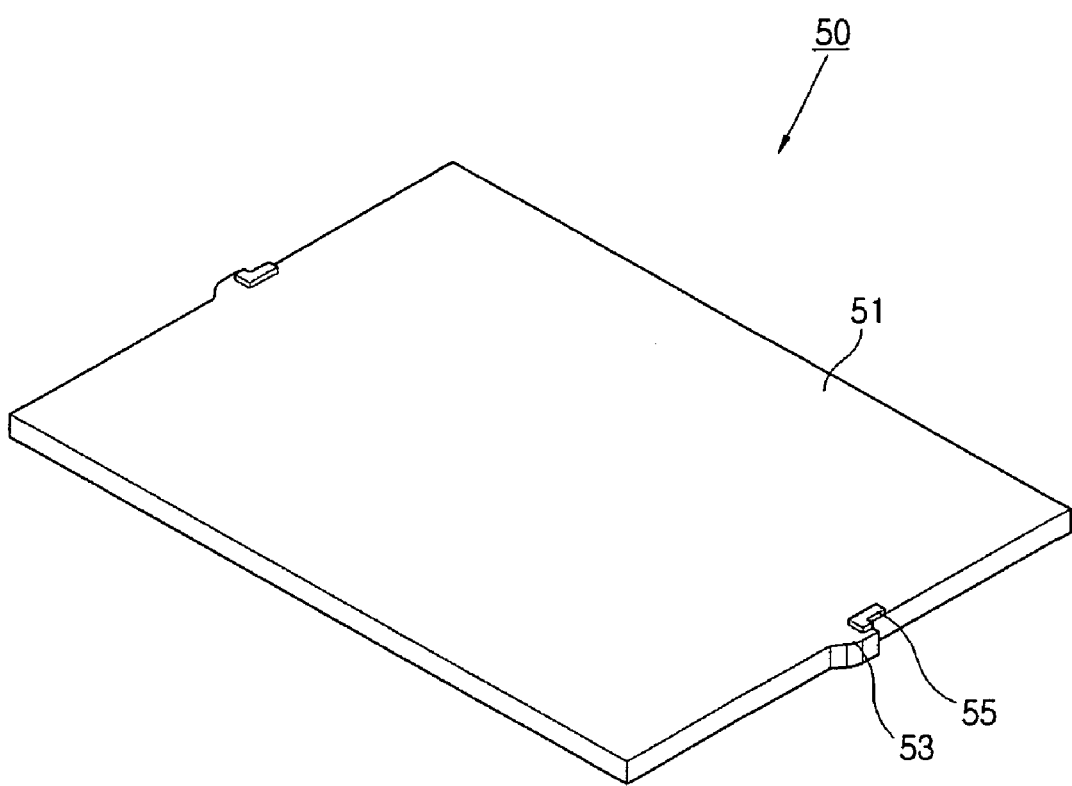
FIG. 3 is a rear view of an exemplary embodiment of a light guiding plate of FIG. 1.

As shown in FIG. 3, the light guiding plate 50 includes a main body 51 in a substantially plate shape, a fixing part 53 projected from a side of the main body 51, and a protrusion 55 extended from the main body 51 and projected toward the accommodating container 80 on a boundary area of the fixing part 53 and the main body 51. FIG. 3 illustrates two of the fixing part 53 and the protrusion 55, but more or less of may be used as is suitable for the purpose described herein.

The fixing part 53 may include a substantially rectilinear shape and/or include multiple surfaces forming an outer side of the fixing part 53. In one exemplary embodiment illustrated in FIG. 3, the fixing part 53 includes at least four surfaces forming the outer side.

The main body 51, in a substantially rectangular plate shape, includes the incident surface and the exit surface and leads light generated in the lamp 41 to the rear of the LCD panel 20. The fixing part 53 may be considered an "ear" or a "wing" and is accommodated in a groove 87 disposed in a lateral side of the accommodating container 80 to fix the light guiding plate 50.

The protrusion 55 is a substantial plate shape with a predetermined thickness measured in a direction substantially parallel to the main body 51. The protrusion 55 effectively decreases the potential for a crack to be formed in the light guiding plate 50 by external impact. The boundary area of the main body 51 and the fixing part 53 may be intensively loaded when the external impact is given, thereby easily generating crack. Increasing a thickness of the boundary area of the main body 51 and the fixing part 53, may reduce stress against the external impact, thereby enhancing reinforcement efficiency of the light guiding plate 50.

Figure 2:
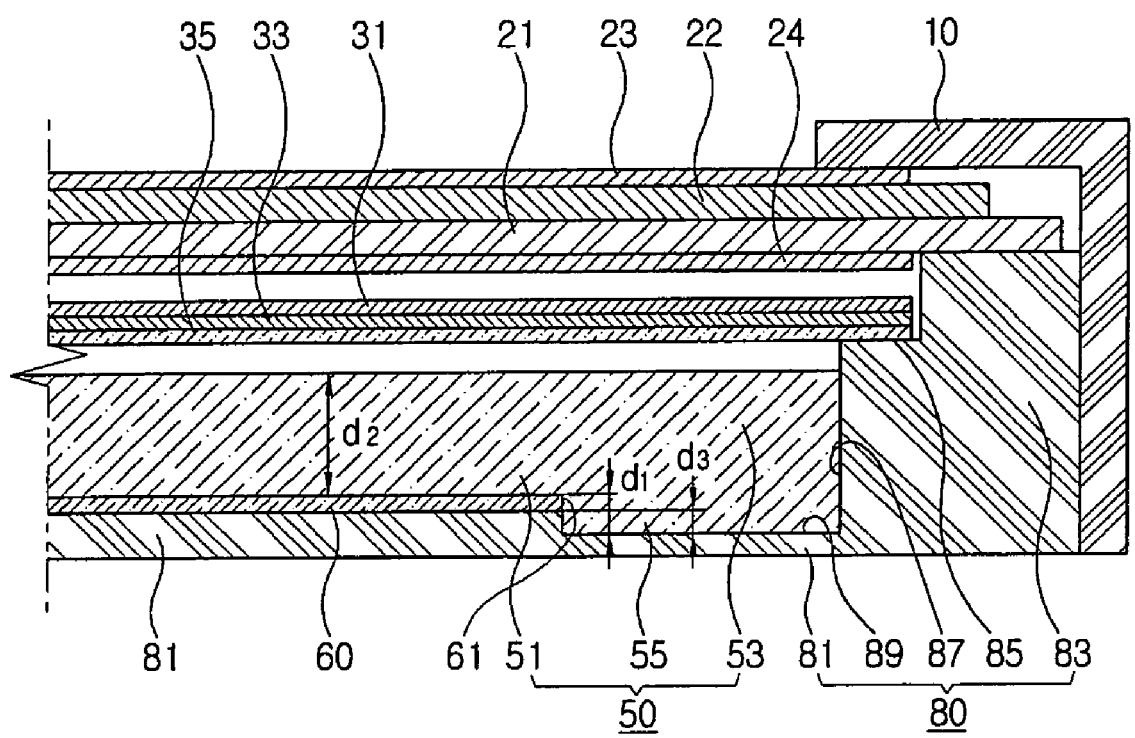
FIG. 2 is a sectional view of the LCD of FIG. 1.

In one exemplary embodiment, with reference to FIG. 2, a thickness d1 of the protrusion 55 is approximately 6%~25% of a thickness d2 of the main body 51. The thickness d1 may be about 0.2 millimeter (mm) to about 0.7 millimeter (mm). If the thickness d1 of the protrusion 55 is less than 0.2 mm, the reinforcement efficiency may not be sufficient to efficiently decrease the potential for generating a crack. If the thickness d1 of the protrusion 55 is more than 0.7 mm, the protrusion 55 may not allow for ease of arrangement considering another components, such as the reflective sheet 60 or the accommodating container 80.

The fixing part 53 disposed along at least one lateral side of the light guiding plate 50 is formed on a lateral side where the light source unit 40 is not disposed. Namely, the light source unit 40 is disposed on one side of the main body 51 and the fixing part 53 is disposed on another side thereof. As illustrated in FIG. 3, the fixing member 53 may be disposed on both sides of the lateral sides of the main body 51 opposite to each other. Advantageously, the light guiding plate 50 is stably fixed.

In exemplary embodiments, the protrusion 55 may be formed in a single body with the main body 51, such as by an injection molding. In alternative exemplary embodiments, the protrusion 55, may be formed separately from the main body 51 and attached or adhered to the boundary area of the fixing part 53 and the main body 51.

Referring again to FIGS. 1 and 2, the reflective sheet 60 is disposed between the light source unit 40 and the accommodating container 80. The reflective sheet 60 reflects light from the light source unit 40 and provides it to the diffusion film 35. In exemplary embodiments, the reflective sheet 60 may include polyethylene terephthalate ("PET") or polycarbonate ("PC").

A hole 61 is disposed on an area of the reflective sheet 60 corresponding to the protrusion 55. The hole 61 has a shape substantially corresponding to the protrusion 55, which is inserted into the hole 61. An area of the reflective sheet 60 occupying the hole may substantially correspond to an area of the shape of the protrusion that is inserted in to the hole 61.

Advantageously, the reflective sheet 60 may be securely set in and attached to the light guiding plate 50.

The accommodating container 80 accommodates the backlight unit 70 and is combined with the fixing member 10. The accommodating container 80 includes an underside 81 and a plurality of a sidewalls 83. The sidewalls 83 extend in a substantially upward-direction from the underside 81 and includes a stair shape along at least one of the sides of the accommodating container 80. In the sidewall 83 including the stair shape, there is formed at least one support part 85 to support edges of the optical sheets 30 and the LCD panel 20. In an alternative exemplary embodiment, a middle mold (not shown) is settled on the upper surface of the sidewall 83 to support the edges of the optical sheets 30 and the LCD panel 20. In the sidewall 83 is formed a fixing cavity 87 in which the fixing part 53 of the light guiding plate 50 is fixed, as shown in FIG. 1.

A holding cavity 89 may be provided on an area of the underside 81 corresponding to the protrusion 55. The holding cavity 89 has a shape substantially corresponding to the shape of the protrusion 55. The protrusion 55 is at least partly held in the holding cavity 89. The holding cavity 89 is provided in the accommodating container 80 to securely hold the light guiding plate 50, thereby protecting the light guiding plate 50 from the external impact.

Referring to FIG. 2, a depth d3 of the holding cavity 89 is approximately 60%~100% of the thickness d1 of the protrusion 55. In one exemplary embodiment, depth d3 may be about 0.12 mm~0.7 mm. If the depth d3 of the holding cavity 89 is less than 0.12 mm, the protrusion 55 may not stably set in the accommodating container 80, such that the LCD 1 may not be protected against the external impact. If the depth d3 of the holding cavity 89 is more than 0.7 mm, it may be hard to form the holding cavity 89 in the accommodating container 80.

The fixing member 10 includes a display window to expose a display area of the LCD 20 and is combined with the accommodating container 80.

One exemplary embodiment of the LCD according to the present invention will be described as follows with respect to its function and effect.

The light guiding plate 50 may be considered a plate. Resistance of the plate against the external impact may be expressed as a second moment, that is a moment of inertia.

The second moment is a value to show the resistance against the external impact according to an area or a thickness of material. The larger the second moment is, the higher the resistance against the external impact. Therefore, the material with high resistance may be more stable.

First, the first moment is a force generated when the material having a micro area is pressurized and is expressed as (distance from standard axis)*(area of cross section).

$$Gx = \int y \, dA \qquad \text{<Formula 1>}$$

Further, the second moment is expressed as (distance from standard axis)^2*(area of cross section), and the value corresponds to the sum of values of the first moment.

$$Ix = \int y^2 \, dA \qquad \text{<formula 2>}$$

Meanwhile, with regard to the stress which is generated by the external impact on the cross section, a stress is in proportion to a distance from a standard axis of the center of gravity, therefore the stress, a force generated in the material when strength is given the material, is expressed as follows.

$$\text{Stress} = \frac{\text{Action moment} * \text{Distance}}{\text{Second moment of area}} \qquad \text{<Formula 3>}$$

If the second moment is large, which makes the stress low, the resistance of the material against the external impact is high and rigidity and stability of the material is high.

In exemplary embodiment, when 2 kgf external impact is applied to the light guiding plate 50, which has protrusions of 0 mm, 0.2 mm, and 0.5 mm, respectively in the thickness d1, stresses of the boundary area of the main body 51 and the fixing part 53 are described below.

When the thickness d1 of the protrusion 55 is 0 mm, the stress of the boundary area is 883 kpa; when the thickness d1 of the protrusion 55 is 0.2 mm, the stress of the boundary area is 847 kpa; and when the thickness d1 of the protrusion 55 is 0.5 mm, the stress of the boundary area is 809 kpa. The stress is reduced 4.1% in the 0.2 mm-thick protrusion 55 and the stress is reduced 8.4% in the 0.5 mm-thick protrusion 55 compared to in the 0 mm-thick protrusion 55.

The stress is reduced as the thickness d1 of the protrusion 55 increases. In the formula 3, since the action moment and the distance are constant, the second moment is variable.

Meanwhile, since a center and a standard axis are constant in each case, y is constant in the formula 2. Therefore, the micro area A increases as the thickness d1 of the protrusion 55 increases, thereby the second moment increases. Namely, since the micro area A becomes large as the thickness d1 increases with respect to the light guiding plate 50, the second moment increases as the thickness d1 increases. Therefore, the stress is reduced in the boundary area of the main body 51 and the fixing part 53, and the potential of generating a crack against the external impact is effectively reduced.

Figure 4:
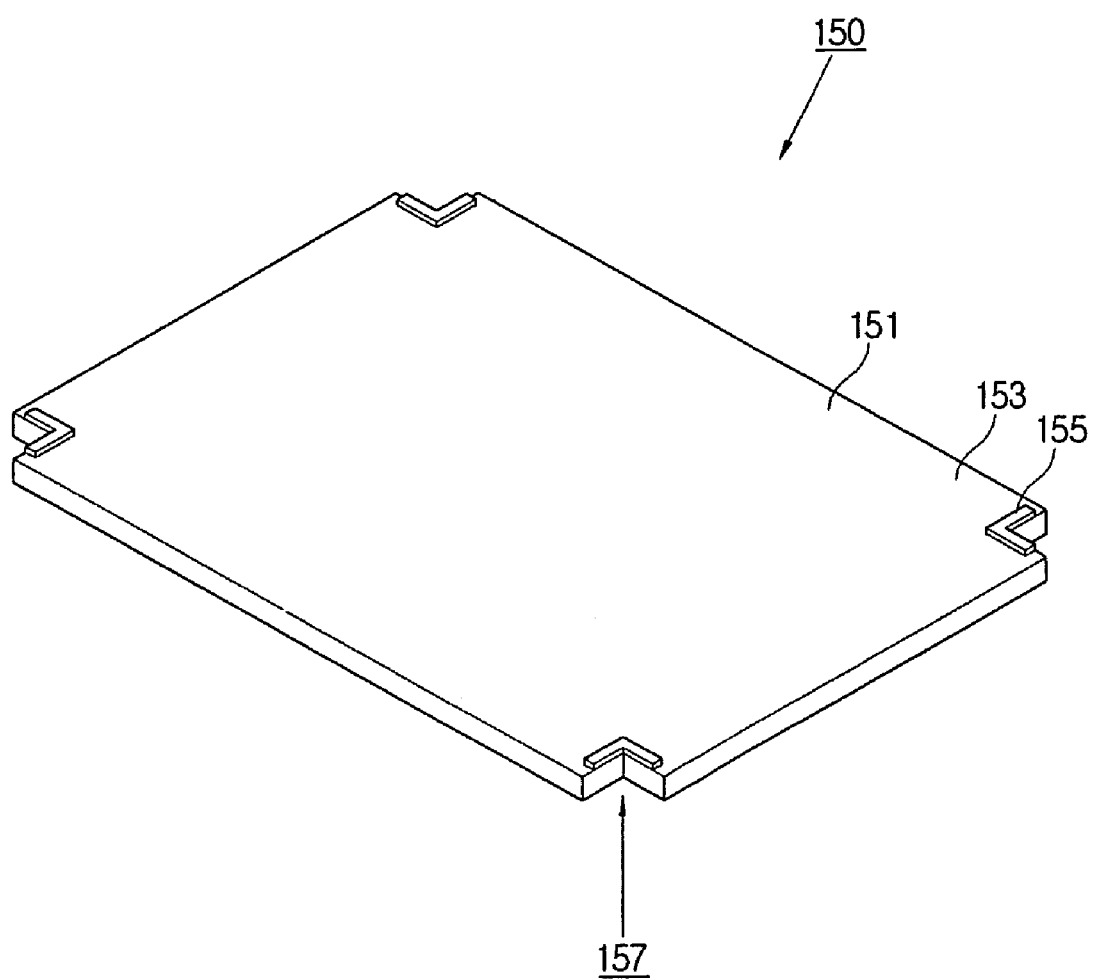
FIG. 4 is a rear view of another exemplary embodiment of a light guiding plate according to the present invention.

Referring to FIG. 4, another exemplary embodiment of the light guide plate according to the present invention will be described in the following.

FIG. 4 is a perspective view of another exemplary embodiment of the rear of a light guiding plate according to the present invention. The light guiding plate 150 is different from the light guiding plate 50 illustrated in FIG. 3. As shown in FIG. 4, the light guiding plate 150 includes a main body 151 in a substantially plate shape, a fixing part 153 extended from a side of the main body 151 outwardly from the main body 151, and a protrusion 155 projected from a boundary area of the fixing part 153 and the main body 151 toward an accommodating container (not shown).

Apart from the fixing part in FIG. 3, the fixing part 153 shown in FIG. 4 has the same width in a direction outward from the main body 151 on each side of the main body 151. On the corner of the light guide plate 150, there is provided a fixing cavity 157 formed substantially in an "L" shape and essentially formed by the main body 151 and the fixing part 153. The fixing cavity 157 is supported by a protrusion (not shown) formed on each edge of the accommodating container 180.

The protrusion 155 is formed on the boundary area of the main body 151 and the fixing part 153 and extends toward the accommodating container. The boundary area where the protrusion 155 is disposed is thicker than the main body 151 without the protrusion 155. A thickness of the protrusion 155 in FIG. 4. may be the same as discussed for the protrusion 55 described with respect to FIG. 3.

Stress against external impact may be reduced as the edges of the light guide plate 150 increase in thickness. Advantageously, the light guiding plate 150 is enhanced in reinforcement efficiency. Additionally, the potential of generating a crack in the light guiding plate 150 is also reduced.

Figure 5:
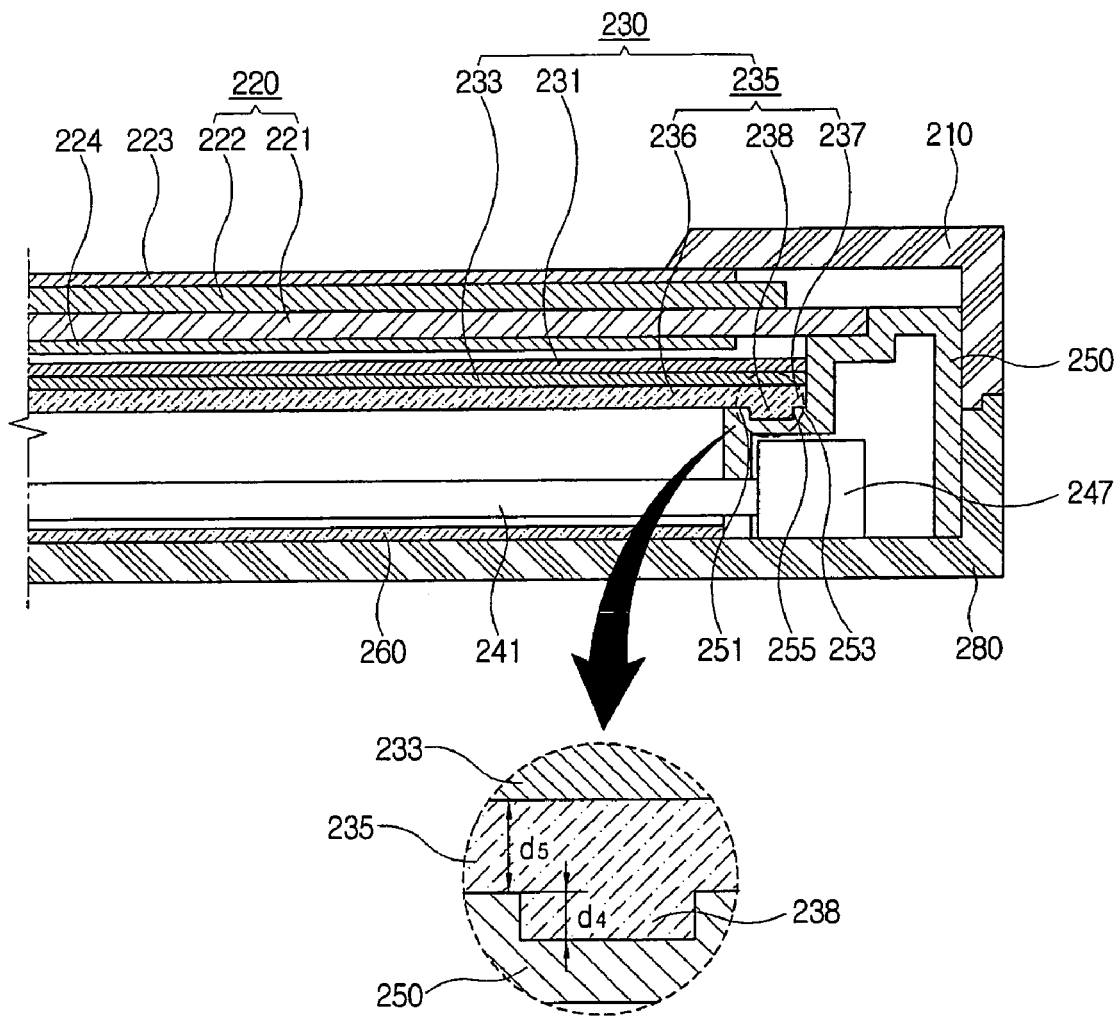
FIG. 5 is a sectional view of another exemplary embodiment of an LCD according to the present invention.

Referring to FIG. 5, another exemplary embodiment according to the present invention will be described in the following. In the embodiment, the LCD is a direct type LCD, but an LCD according to the present invention may include any of a number of LCD types.

The direct type LCD does not use a light guiding plate, but uses a diffusion member 235 in substantially a plate shape with a predetermined thickness, instead. Since the diffusion member 235 may also be broken by external impact, enhancing reinforcement efficiency of the diffusion member 235 by disposing a protrusion 238 thereon may be employed.

As shown in FIG. 5, the LCD includes an LCD panel 220 on which images are formed, a driver integrated circuit (not shown) driving the LCD panel 220, optical sheets 230 disposed in the rear of the LCD panel 220, a light source unit providing light to the rear of the LCD panel 220, a side mold 250 holding an end portion of the light source unit and supporting edges of the optical sheets 230, an accommodating container 280 accommodating the light source unit and the side mold 250, and a fixing member 210 combined with the accommodating container 280 and covering the front surface of the LCD panel 220.

The LCD panel 220 includes a thin film transistor ("TFT") substrate 221, a color filter substrate 222 adhering opposite to the TFT substrate 221, and liquid crystals (not shown) interposed between the two substrates. Also, the LCD panel 220 further includes polarizing plates 223,224 disposed in front of (on an upper surface) the color filter substrate 222 and in the rear of (on a lower surface) the TFT substrate 221, respectively, to polarize light passing through the LCD panel 220.

A reflective sheet 260 is disposed between the light source unit and the accommodating container 280 to uniformly spread light provided from the light source unit towards the LCD panel 220. In exemplary embodiments, the reflective sheet 260 may include polyethylene terephthalate ("PET") or polycarbonate ("PC").

The light source unit in the direct type LCD is disposed in the entire rear of the LCD panel 220 and includes a lamp 241 and a lamp holder 247 into which an end portion of the lamp 241 is inserted. Further, the optical sheets 230 include a protection sheet 231, a prism sheet 233, and the diffusion member 235 which are disposed in the rear of the LCD panel 220.

The diffusion member 235, substantially in a plate shape with a predetermined thickness, includes a main body 236 substantially in a plate shape, a fixing part 237 projected on at least one side of the main body 236, a protrusion 238 formed on a boundary area of the fixing part 237 and the main body 236. The protrusion 238 is projected from the main body 236 toward the accommodating container 280. In exemplary embodiments, one or more of the fixing part 237 and the protrusion 238 may be employed in the diffusion member 235.

In one exemplary embodiment, a thickness d4 of the protrusion 238 is approximately 6%~25% of the thickness d5 of the diffusion member 235 at the main body 236.

The side mold 250 may be disposed on opposing sides of the accommodating container and hold an end portion of the light source unit. The side mold 250 supports the edges of the optical sheets 230. The side mold 250 includes a supporting surface 251 supporting the edges of the optical sheets 230, a fixing cavity 253 accommodating at least a portion of the fixing part 237, and a holding cavity 255 in which at least a portion of the protrusion 238 is held.

The boundary area of the main body 236 and the fixing part 237 are increased in the thickness by the protrusion 238. Stress against external impact is reduced, thereby enhancing the reinforcement efficiency of the diffusion member 235. Advantageously, potential for generating crack in the diffusion member 235 is reduced.

In other exemplary embodiments, thickness of an outer edge or boundary area of other components which may be easily broken or damaged by the external impact, such as the protection sheet and the prism sheet, may be increased to reduce the potential for damage to the components.

Although exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A liquid crystal display (LCD) comprising:
   an LCD panel; and
   a light guiding plate disposed on a rear of the LCD panel, the light guiding plate comprising:
      a main body,
      a fixing part extending from a side of the main body, the side of the main body defining a boundary line between the fixing part and the main body, and
      a protrusion formed on a rear of the light guiding plate and overlapping each of the fixing part, the main body and the boundary line between the fixing part and the main body.

2. The LCD of claim 1, further comprising an accommodating container receiving the light guiding plate, wherein the protrusion faces the accommodating container.

3. The LCD of claim 2, wherein the accommodating container comprises a holding cavity in which a portion of the protrusion is held.

4. The LCD of claim 3, wherein a depth of the holding cavity is approximately 60%~100% of a thickness of the protrusion.

5. The LCD of claim 3, wherein a depth of the holding cavity is about 0.12 mm to about 0.7 mm.

6. The LCD of claim 1, wherein a thickness of the protrusion is approximately 6%~25% of a thickness of the main body.

7. The LCD of claim 1, wherein a thickness of the protrusion is about 0.2 millimeter (mm) to about 0.7 millimeter (mm).

8. The LCD of claim 1, further comprising a reflective sheet disposed between the light guiding plate and the accommodating container, the reflective sheet comprising a hole in an area corresponding to the protrusion, wherein the hole is shaped substantially corresponding to a shape of the protrusion.

9. The LCD of claim 1, further comprising a light source unit disposed along a first side of the main body, wherein the fixing part is disposed on a second side of the main body which does not face the light source unit.

10. The LCD of claim 1, wherein the fixing part is disposed on a first side and a second side of the main body.

11. The LCD of claim 1, wherein the main body is substantially a plate shape.

12. The LCD of claim 1, wherein the fixing part is extended outwardly from a side of the main body.

13. The LCD of claim 1, wherein the protrusion is projected in a direction substantially away from the LCD panel.

14. The LCD of claim 2, wherein the accommodating container comprises a fixing cavity in which a portion of the fixing part is held.

15. The LCD of claim 14, wherein the fixing cavity is substantially formed by the main body and the fixing part, the fixing cavity having substantially an "L"-shape.

16. A method of forming a liquid crystal display (LCD), the method comprising:

forming a light guide member, the forming a light guide member comprising:

forming a fixing part extending from a side of a main body, the side of the main body defining a boundary line between the fixing part and the main body; and forming a protrusion on a boundary line between the fixing part and the main body; and disposing the light guide member under an LCD panel, wherein the protrusion extends in a direction away from the LCD panel, and overlaps each of the fixing part, the main body and the boundary line between the fixing part and the main body.

\* \* \* \* \*